(12) United States Patent
Kiepe et al.

(10) Patent No.: US 10,977,494 B2
(45) Date of Patent: Apr. 13, 2021

(54) RECOGNITION OF WEED IN A NATURAL ENVIRONMENT

(71) Applicant: Bayer CropScience Aktiengesellschaft, Monheim am Rhein (DE)

(72) Inventors: Bjoern Kiepe, Mühlhausen (DE); Thomas Schilling, Bornheim (DE); Franco Fois, Monheim (DE); Daniel Rechsteiner, Cologne (DE); Sebastian Hellweg, Leverkusen (DE); Alexandra Gladbach, Leverkusen (DE); Birgit Stepponat, Langenfeld (DE)

(73) Assignee: BASF AGRO TRADEMARKS GMBH, Ludwigshafen am Rhein (DE)

( * ) Notice: Subject to any disclaimer, the term of this patent is extended or adjusted under 35 U.S.C. 154(b) by 91 days.

(21) Appl. No.: 16/300,198

(22) PCT Filed: May 5, 2017

(86) PCT No.: PCT/EP2017/060751
§ 371 (c)(1),
(2) Date: Nov. 9, 2018

(87) PCT Pub. No.: WO2017/194399
PCT Pub. Date: Nov. 16, 2017

(65) Prior Publication Data
US 2019/0147249 A1    May 16, 2019

(30) Foreign Application Priority Data

May 12, 2016  (EP) .................................. 16169416
Aug. 3, 2016  (EP) .................................. 16182582

(51) Int. Cl.
*G06K 9/00* (2006.01)
*G06K 9/46* (2006.01)
*G06K 9/62* (2006.01)

(52) U.S. Cl.
CPC ....... *G06K 9/00671* (2013.01); *G06K 9/4638* (2013.01); *G06K 9/4652* (2013.01); *G06K 9/627* (2013.01)

(58) Field of Classification Search
None
See application file for complete search history.

(56) References Cited

U.S. PATENT DOCUMENTS

2015/0187109 A1\* 7/2015 Mentzer .................. G06T 11/00
345/632

FOREIGN PATENT DOCUMENTS

CN        203149656 U    8/2013

OTHER PUBLICATIONS

Weis, Martin. "An image analysis and classification system for automatic weed species identification in different crops for precision weed management." (2010). (Year: 2010).\*

(Continued)

*Primary Examiner* — Vu Le
*Assistant Examiner* — Tracy Mangialaschi
(74) *Attorney, Agent, or Firm* — Lowenstein Sandler LLP (57) ABSTRACT

A method for identifying of a type of weed in a natural environment may be provided. The method comprises receiving a digital image of the weed in an early growth stage together with related metadata, contouring areas of leaves and determining whether the weed is a monocotyledon or a dicotyledon. Furthermore, the method comprises determining a growth stage and determining the type of weed identified by a weed name and a probability of the correctness of the determination using at least one out of a plurality of the received metadata and a plurality of metadata determined during the contouring, during the determining whether the weed is a monocotyledon or a dicotyledon, and during the determination of the growth stage of the weeds as (Continued)

input parameters to a set of classifiers using a storage comprising names of types of weeds together with a plurality of sets of metadata per weed type.

17 Claims, 6 Drawing Sheets

(56) References Cited

OTHER PUBLICATIONS

Rumpf, Till, et al. "Sequential support vector machine classification for small-grain weed species discrimination with special regard to Cirsium arvense and Galium aparine." Computers and electronics in agriculture 80 (2012): 89-96. (Year: 2012).*

Scharr H, Minervini M, French AP, Klukas C, Kramer DM, Liu X, Luengo I, Pape JM, Polder G, Vukadinovic D, Yin X. Leaf segmentation in plant phenotyping: a collation study. Machine vision and applications. May 1, 2016;27(4):585-606. (Year: 2016).*

Casanova, D., et al., "IFSC/USP at ImageCLEF 2011: Plant identification task", CLEF 2012 Working Notes, vol. 1178, Sep. 7, 2014, entire article.

"Exif", Wikipedia, https://en.wikipedia.org/wiki/Exif (retrieved on Sep. 16, 2016).

Extended European Search Report for EP Patent Application No. 16169416.1 dated Nov. 28, 2016.

Extended European Search Report for EP Patent Application No. 16182582.3 dated Jan. 26, 2017.

Gonzales, J., et al., "Green", Wikipedia, https://en.wikipedia.org/wiki/Green (retrieved on Nov. 16, 2016).

Haug, S., et al., "A Crop/Weed Field Image Dataset for the Evaluation of Computer Vision Based Precision Agriculture Tasks", ECCV 2014 Workshops, vol. 8928, (2015), pp. 105-116.

Hess, M., et al., "Use of the extended BBCH scale—general for the descriptions of the growth stages of mono- and dicotyledonous weed species", Weed Research, vol. 37, No. 6, (1997), pp. 433-441.

Rejeb Sfar, Asma, et al., "Confidence Sets for Fine-Grained Categorization and Plant Species Identification", International Journal of Computer Vision, vol. 111, No. 3, (2014), pp. 255-275.

Rumpf, T., et al., "Sequential support vector machine classification for small-grain week species discrimination with special regard to *Cirsium arvense* and *Galium aparine*", Computers and Electronics in Agriculture, vol. 80, (2012), pp. 89-96.

Scharr, H., et al., "Leaf segmentation in plant phenotyping: a collation study", Machine Vision and Applications, vol. 27, No. 4, (2015), pp. 585-606.

Weyrich, M., et al., "Quality assessment of row crop plants by using a machine vision system", Proceedings of the Institute of Electrical and Electronics Engineers (IEEE) Industrial Electronics Society IECON 2013—39th Annual Conference, Vienna, Austria, Nov. 10-14, 2013, pp. 2466-2471.

International Search Report for PCT/EP2017/060750 dated Aug. 17, 2017.

International Search Report for PCT/EP2017/060751 dated Jul. 13, 2017.

Written Opinion of the International Searching Authority for PCT/EP2017/060750 dated Aug. 17, 2017.

Written Opinion of the International Searching Authority for PCT/EP2017/060751 dated Jul. 13, 2017.

* cited by examiner

RECOGNITION OF WEED IN A NATURAL ENVIRONMENT

CROSS-REFERENCE TO RELATED APPLICATIONS

This application is a national stage application (under 35 U.S.C. § 371) of PCT/EP2017/060751, filed May 5, 2017, which claims benefit of European Application Nos. 16169416.1, filed May 12, 2016, and 16182582.3, filed Aug. 3, 2016, all of which are incorporated herein by reference in their entirety.

FIELD OF THE INVENTION

The invention relates generally to weed identification, and more specifically to a method for identifying a type of weed in a natural environment. The invention relates further to an identification system for an identification of a type of weed in a natural environment, and a computer program product.

BACKGROUND

Farming is currently undergoing its next development stage. After an industrialization of many farming processes and a series of automation initiatives, the introduction of high-tech tools in the farming process continues. Adding to this context, the phenomenon of the Internet of Things (IoT) does not at agriculture.

Because farmers are more than interested in increasing their harvesting yields as well as reducing their costs, many efforts are put into measures to enhance farming efficiency. A considerable influence on the yield is given by reducing factors like pests, illnesses and weeds in the fields. In order to fight weeds, farmers consequently use herbicides, but such treatment in general involves high efforts and costs. So far, when applying herbicides, farmers need to rely on their experience and individual knowledge to identify weeds. This expertise might not be met by all farming personnel, so any help when deciding on how to fight existing weeds is highly appreciated. In addition, a correct identification of weeds, and thus choosing the right herbicides in the correct amount, is instrumental to saving resources and further protect the environment.

Following this, there is a need for technical assistance for identifying weeds in a farm field without the manual process of picking individual leaves of a potential weed plant out in the field and trying to identify the type of weed in a back-office using some literature. It is therefore an objective of the current application to provide a method and a system for identifying weeds in a natural environment among cultivated crop.

SUMMARY

This need may be addressed by a method for identifying of a type of weed in a natural environment, a recognition system for an identification of a type of weed in a natural environment, and a computer program product, according to the independent claims.

According to a first aspect of the invention, a method for identifying a type of weed based on a digital image of the weed in a natural environment may be provided. The method may comprise receiving a digital image comprising data representing a weed in an early growth stage in the natural environment among cultivated crop. Additionally, metadata relating to the digital image may be received.

The method may further comprise contouring areas with a predefined color and texture specification in an RGB color model within the digital image thereby building at least one contoured area comprising pixels of the weed within a boundary contour, and determining whether the weed is a monocotyledon or a dicotyledon.

Furthermore, the method may comprise determining a growth stage of the weed by isolating at least a single leaf of the weed by determining a joint center of the contoured area, and determining the number of leaves within the contoured area.

A further feature of the method may comprise determining the type of weed identified by a weed name and a probability of the correctness of the determination using at least one out of a plurality of the received metadata, and a plurality of derived metadata determined during the contouring, during the determining whether the weed is a monocotyledon or a dicotyledon, and during the determination of the growth stage of the weeds as input parameters to a set of classifiers. The set of classifiers may have access to a storage comprising names of types of weeds together with a plurality of sets of metadata per weed type.

According to another aspect of the present invention an identification system for an identification of a type of weed based on a digital image of the weed in a natural environment may be provided. The identification system may comprise a receiving unit adapted for receiving a digital image comprising data representing a weed in an early growth stage in the natural environment among cultivated crop, and metadata relating to the digital image, a contouring unit adapted for contouring areas with a predefined color and texture specification in an RGB color model within the digital image building at least one contoured area comprising pixels of the weed within a boundary, and a first classifier unit adapted for determining whether the weed is a monocotyledon or a dicotyledon.

The identification system may further comprise a determination unit adapted for determining a growth stage of the weed by isolating at least a single leaf of the weed by determining a joint center of the contoured area, and determining the number of leaves within the contoured area.

Additionally, the identification system may comprise a second classifier unit comprising a set of second classifiers adapted for determining the type of weed identified by a weed name and a probability of the correctness of the determination using at least one out of a plurality of the received metadata, and a plurality of metadata determined by the contouring unit, the first classifier unit, and the determination unit for determining the growth stage of the weed as input parameters. The second classifiers may have access to a storage system comprising names of types of weeds together with a plurality of sets of metadata per weed type.

It may be noted that the identification system may be implemented as part of a private computing center or a shared computing center, like a cloud computing center. The digital image may be taken by a digital camera in the farm field and received by the identification system for further processing. The image capturing device or digital camera may be operated manually by the farmer, a consultant or any other person. Alternatively, the camera may be installed on a flying drone, which may be operated autonomously or which may be controlled remotely.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The proposed method for recognizing of a type of weed in a natural environment may offer a couple of advantages and technical effects:

Automatically detecting a type of weed and determining the correct weed name is of high value for farmers in the field. Weeds in a crop field may change from season to season, from weather condition to weather condition and from one year to another year. In addition, the phenotypic appearance of weeds may change based on environmental conditions such that also specialists may not be able to identify a type of weed in a reliable manner. Especially during early growth stages, it is difficult to recognize small differences in the appearance of a specific weed. Using a camera, e.g., from a smartphone, taking a picture, performing a preanalysis within the smartphone and/or sending the picture to an identification system may provide significant value for the farmer. He may decide instantly which type of herbicide to use in order to fight the developing weed among his crop. It may also help to apply the herbicide only onto those areas where the weed has grown. In order to fight weeds only in spots of a farming field, additional zoning information of the distribution of the weeds in the field may be required.

The task of capturing an image of a potential weed may also be performed by noneducated farmers, support personnel or temporary staff without any experience in recognizing weed. This may save valuable time and money in the farming process. It may be possible to reduce the image information of the digital image to a useful minimum. Together with the usage of a high performance, highly sophisticated weed identification system in the form of a set of classifiers or a neural network system, the farmer may be enabled to determine the name of the weed only using his smartphone more or less instantaneously. The usage of metadata as input values for the classifiers determining the weed name together with the probability of one or more weed types and sending this information back to the capturing smartphone may allow for a sophisticated interaction between the farmer and the backend system. It also allows determining that weed name with a high probability and to advise the farmer how to proceed. Moreover, it may also be possible to implement the classifier technology in high-performance multi-core based smartphones or dedicated weed analysis systems.

Furthermore, this whole process of capturing and receiving the image of the weed and sending back the weed name—with a probability rating—may be performed within a very short amount of time, e.g., seconds. No special equipment, like special cameras, may be required in the field because smartphones are omnipresent today. Thus, the costs for the recognition process may also be kept comparably low in comparison to traditional technologies because a large plurality of simple smartphones may use the identification system in a cloud computing manner.

Finally, the weed identification process, performed by the highly sophisticated identification system may be available also to an unexperienced farmer allowing him to fight weeds and increase his farming yield.

Furthermore, the proposed method and system allows an identification, determination and/or recognition of weed in a natural environment and not only in the glass house under artificial conditions. This may prove to be an invaluable advantage to farmers working in the field because everything can be achieved live and under realistic daily working conditions. Recognizing weed in a natural environment has proven to be much harder than under glass house conditions because the number of variables is significantly higher. In a glass house there may be constant light, no direct sunshine or single light source related strong shadowing, no light angle variations related to time of the day, leading to changing and unpredictable reflections and color appearance, no cloud, no fog or haze or varying soil conditions, no varying wetness conditions, no wind induced plant movement, no insect related leaf damage, just to name a few parameters why a recognition in a natural environment cannot be compared with a weed recognition in a glass house. Thus, all of the above-mentioned circumstances vary under natural conditions, which may represent a significant difference to partially known technologies for image recognition which rely typically on optimal and artificial environmental conditions.

In the following, additional embodiments of the proposed method for identifying of a type of weed in a natural environment will be described. It may be noted that the embodiments may be implemented in form of the method or in form of the related system.

According to one preferred embodiment of the method, the predefined color specification may relate to a color range of weed in a natural environment, featuring the complete visible range and in particular focus on the green color range of wavelength of, e.g., 490 to 575 nm. This may reduce "image noise" from background information also captured as part of the digital image. Also the background of the captured weed may comprise single or small groups of green pixels falling into this wavelength range. The contouring may eliminate this background green information spots. The allowable wavelength range (e.g., 490 to 575 nm) may be stored in a table, a database or another suitable data format.

The texture specification may relate to leaf veins, characteristic forms of leaf segments, specific patterning and color distribution, micro hairs on the surface atop of the leaf and on the edge of the leaf. All of these and additional characteristic textures may not explicitly be parameterized but belong to the "learnt" context of the trained classifier correlation function(s).

According to an additionally preferred embodiment of the method, the contouring the areas with the predefined color and texture specification may be performed by determining for every combined color of the digital image whether a combination of its color components may match one of a plurality predefined color combinations. Typically, image detectors function using the known RGB color model (red-green-blue) utilizing 3 sub-pixels for every complete pixel, wherein one sub-pixel is used for one of the 3 basic colors red, green and blue. The so specified color space boundaries with predefined color information and distribution of intensities within the RGB model of the sub-colors pixel information may be stored as reference. This way, a fast comparison between each pixel of the digital image and the stored reference color information may be performed by which a pixel of the captures digital image may be selected as part of the to-be-contoured area or not.

According to one advantageous embodiment of the method, contouring of areas with the predefined color specification may be performed additionally by a determination of 1. $w_i = F(p_i, p_{i,j})$, wherein (Eq. 1)

$w_i=1$ or 0 indicating that pixel i may belong to weed or not. This may be performed in addition to the more straight forward comparison against allowed color information for a single pixel. F may be a function calculating a probability for weed, respectively non-weed based on color attributes of $p_i$ and all of $p_j$, $p_i$=pixel i, and $p_{i,j}$=pixels j surrounding the pixel i. The number of pixels counted as surrounding pixel i may vary. E.g., only one ring or surrounding pixels may be used; this may be 8 pixels $p_{i,j}$. Moreover, a next ring of pixels $p_{i,j}$ surrounding the first ring may also be considered; this second ring may comprise additional 16 pixels $p_{i,j}$. Additional pixel rings may be considered and different rings may be multiplied with decreasing weighing factors the more distant a pixel ring is from pixel i. This may enable a more thorough determination whether a pixel of the captured digital image should count as weed pixel or not.

According to one permissive embodiment of the method, the early growth stage may be defined by a BBCH code from 10 to 39. Using the BBCH code (the international accepted code from Biologische Bundesanstalt, Bundessortenamt and CHemische Industrie in Germany) may help to achieve comparable results in an early growth stage of weed. Typically, weed with a growth stage according to BBCH code below 10, e.g., first leaves emerging, may not be recognizable even by an expert. Weed with a BBCH code larger or equal 40 may be too much grown up to fight it successfully with herbicides. However, also weed with a BBCH code below 10 may be recognized with a lower probability. Increased spectral analysis of the color information of the contoured area may be instrumental for achieving this.

According to one useful embodiment of the method, the determining whether the weed is a monocotyledon or a dicotyledon may comprise applying a classifier which has been trained to distinguish between monocotyledon and dicotyledon weeds resulting in a binary monocot-dicot identifier value. Classifiers like neural network classifiers may be well suited for a differentiation between monocotyledon and dicotyledon weed types if the classifiers are well trained with training images. Weed of either the monocotyledon type or the dicotyledon type comprise characteristic features allowing a good differentiation between the two types of weed. The monocot-dicot identifier value may be treated as a derived metadata.

According to one advantageous embodiment of the method, derived metadata may comprise at least one selected out of the group comprising a binary monocot-dicot identifier value, a number of leaves determined, and the determined growth stage. These metadata may be metadata derived from the received digital image. They may be differentiated from the received metadata although both types of metadata may finally be used as parameters to determine the type of weed.

According to a further advantageous embodiment of the method, the received metadata may comprise at least one out of the group comprising global positioning system data (GPS) values of a capturing location of the digital image—in particular for identifying a country or region—a calendar date—in particular for an identification of a season and potentially related weather data—topography data related to the global positioning data system data values—in particular an identification of the height above sea level and or geological data—acceleration data of a capturing device during a moment of capturing the digital image, a tilt angle of the capturing device during capturing the digital image, and the camera type the digital image was captured with. Some of these metadata may be received together with the digital image from, e.g., a smartphone or alternatively from one or more databases from a server. They may also be received for another computing system, e.g., a cloud computing center providing weather data or topology data based in GPS and date/time data.

According to an additionally preferred embodiment of the method, each metadata value—received and/or derived—may have a predefined weighing value which may also be used as input parameter to the set of classifiers. These parameters may be used for a fine tuning of the proposed method and system. The parameters may be learned automatically comparing data for different seasons or they may be set manually reflecting made experiences with the system by the farmers and managers.

According to a further preferred embodiment of the method, the determination of the type of weed identified by its weed name may also comprise comparing the name of the determined weed name with a weed probability map which may map probability occurrences of weeds for geographic locations and seasonal data and recalculating the probability of the correctness of the determination based on the comparing the name of the determined weed name with a weed probability map. This additional adjustment may contribute to an even more precise determination of the type of weed. It may, e.g., exclude a wrongly identified type of weed because the probability to determine that type of weed at the given time of the year (season) and/or geographic region may be relatively unlikely.

It may also be mentioned that other meta data value may be included in the determination process like the type of weed grown in the actual season and seasons before including the related types of weed detected during these earlier seasons on the actual field or on other fields in the same or similar crop growing regions. This type of additional information may also be refected in the probability map.

Furthermore, the method may comprise sending the identified weed names and a related probability of the correctness of the determination for the weed names having the three highest probability values. The wireless sending may—in case a human being may have operated the digital camera for capturing the digital image—be directed to the operator of the camera, and more precisely to a smartphone of the operator. If—on the other hand—a digital camera may be installed on an automatic vehicle like a drone or an automatic wheel based field robot, the names and probabilities may be sent to a farmer's smartphone or another mobile device of the farmer wirelessly including the GPS coordinates where the weed was found. A special software application may then render the location of the found weed on a geographical map of the farm.

Furthermore, embodiments may take the form of a related computer program product, accessible from a computer-usable or computer-readable medium providing program code for use, by or in connection with a computer or any instruction execution system, like a smartphone. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE SEVERAL VIEWS OF THE DRAWINGS

It should be noted that aspects of the invention are described with reference to different subject-matters. In particular, some embodiments are described with reference to method type claims whereas other embodiments have been described with reference to device type claims. However, a skilled person of the art will gather from the above and the following description that, unless otherwise notified, in addition to any combination of features belonging to one type of subject-matter, also any combination between features relating to different subject-matters, in particular, between features of the method type claims, and features of the device type claims, is considered as to be disclosed within this document.

The aspects defined above and further aspects of the present invention are apparent from the examples of embodiments being described hereinafter. They are explained with reference to the examples of embodiments, but to which the invention is not limited.

Preferred embodiments of the invention will be described, by way of example only, and with reference to the following drawings.

DETAILED DESCRIPTION

In the context of this description, the following conventions, terms and/or expressions may be used:

The term 'identifying', in particular 'identifying a type of weed' or 'recognizing a type of weed' or also 'determining' may denote an automated machine-based determination or recognition process for an identification of a specific type of weed starting from a received digital image from a digital camera, pre-processing of the digital image, deriving metadata during the processing of the digital image and use these by, e.g., neural network based classifiers for a probability based analysis of the image data, and finally an identification of one or more type(s) of weed.

The term 'weed' may denote an unwanted plant of any species that may quickly adapt to almost any environment. Here, the expression weed may also be related to plants among crop or cultivated or economic plants that are useful in the sense of harvesting fruits of grown up seed. Weed may disturb or negatively impact the process of the crop growth and decrease the yield of an agriculture field.

The term 'natural environment' may—in the context of plants like crop or weed—denote that the plants grow in a field or on land which may be exposed to natural weather and environmental conditions, like humidity and direct or indirect sun light and other weather phenomena. Hence, a natural environment excludes artificial environments like glass houses or other non-natural growing environments for plants. Such unnatural environments with controlled conditions may artificially exclude numerous influence factors, which make the recognition process much harder or—in many cases—impossible. This feature may prove to be an advantage of the currently proposed method and system because it may be much easier to differentiate between crop and weed in an artificially controlled environment. Under extremely controlled conditions it may be much easier to recognize a specific type of weed because a large number of types of weeds may be excluded upfront given the specific and controlled conditions of, e.g., a glass house.

The term 'early growth stage' may denote a stage of a plant in which the plant, in particular the weed, may not have grown to an adult stage. Very early growth stages may be difficult to recognize anyway. It has been shown that the usage of the 'BBCH code' may be useful when describing growth stages of plants, e.g., weed. The abbreviation BBCH stands officially for "Biologische Bundesanstalt, Bundessortenamt and CHemische Industrie" and describes phenological growth stages of a plant. The code goes from 00 to 99. A BBCH code of 10 to 19 represents different early development stadiums of leaves. The principal growth stage 2 includes BBCH codes 20 to 29 and is about formation of side shoots/tillering. The principal growth stage 3 (BBCH codes 30 to 39) comprises stem elongation/shoot development (main shoot). Thus, focusing on weed with BBCH codes between 10 and 39 may represent a good focus on weed in an early growth stage.

The term 'contouring' may denote a process of a determination of a contour of a certain area or surface having common or similar color and/or textual characteristics of, e.g., weed in a digital picture. Each leaf of plants, in particular weed, has a natural boundary or outer edge or edges of the leaf. The process of contouring captures, recognizes and/or determines these edges such that inside the related contoured area all or almost all pixels of the weed may be included.

The term 'color and texture specification' may denote digital information about pixels in a digital image according to a color model, e.g., the RGB color model (red, green, blue). However, other color models may be used, like HSV (hue, saturation, value), HSL (hue, saturation, lightness/luminance). It is well known in the industry that most color model information from one color model may be transformed to another color model by a mathematical matrix operation. Different color models may have different advantages like most natural color representations, best suitable for digital processing, optimally adapted for grayscale processing, best suited for edge recognition and thus for contouring, and so on.

The term 'RGB color model' may denote the well-known additive color model in which red, green, and blue lights are added together in various ways to reproduce a broad array of colors. The name of the model comes from the initials of the three additive primary colors, red, green, and blue. The main purpose of the RGB color model is for the sensing, representation, and display of images in electronic systems, such as televisions and computers, though it has also been used in conventional photography. Before the electronic age, the RGB color model already had a solid theory behind it, based in human perception of colors. RGB is a device-dependent color model: different devices may detect or reproduce a given RGB value differently since the color elements (such as phosphors or dyes) and their response to the individual R, G, and B levels vary from manufacturer to manufacturer, or even in the same device over time. Thus, an RGB value may not define the same color across devices without some kind of color management and mathematical transformations.

The term 'classifier' or 'classifier correlation function', and in particular 'trained classifier correlation function' may denote one or more mathematical functions allowing to measure a similarity of features between one or more sections of a captured image and a set of reference image data by which the classifiers may have been trained. The feature parametrization of a correlation function may not be programmed manually but may be trained, i.e., learned using datasets with a known plurality of input attributes as well as the desired result. A skilled person will know various types of correlation approaches.

Actually, this approach may also be used for the texture specification as well as the monocotyledon/dicotyledon differentiation and/or the type of weed determination. No parameters may be specified explicitly but automatically derived during the training sessions of the classifier correlation function(s).

Several types of classifiers are known and may be used for the inventive concept. Abstractly, a classifier—e.g., implemented as an algorithm—maps input data to a predefined category. Classifiers are typically used in machine learning. They are trained using a defined set of training data which shall generate a known outcome, representing a sort of supervised learning. One example for a classifier is a linear classifier in which the predicted category is the one with the highest score. This type of score function is known as a linear predictor function and has the following general form:

$$\text{Score }(X_i, k) = \beta_k * X_i,$$

$X_i$ is the feature vector for instance i, $\beta_k$ is the vector of weights corresponding to category k, and score $(X_i, k)$ is the score associated with assigning instance i to category k. Feature vector may be binary, categorical, ordinal, integer-valued or real-valued. Classifiers may also work as binary or multi-class classifier.

Another type of classifier is a bio-inspired neural network classifier working with simulated neurons receiving a set of input values and synaptic elements building a link between an output of one neuron and an input of another neuron. From manually annotated images (training images), a set of features of the plants is extracted and used to train the neural network (supervised learning). After training, the same set of features is extracted for each new image (test image) and the neural network uses these features to classify the plant in the image.

The term 'weed probability map' may denote a geo-based map denoting probabilities for finding a weed at an geographical position determined by geo-coordinates on the earth's surface and related altitude values combined with seasonal data as well as historic data about times and intensity of having found a specific weed at the location in question. Thus, in simple words, the weed probability map may be instrumental in answering the question: How probable is it to find a specific type of weed at a given location at a given time in the year.

In the following, a detailed description of the figures will be given. All instructions in the figures are schematic. Firstly, a block diagram of an embodiment of the inventive method for identifying of a type of weed in a natural environment is given. Afterwards, further embodiments as well as embodiments of the identification system for a recognition of a type of weed in a natural environment will be described.

Figure 1:
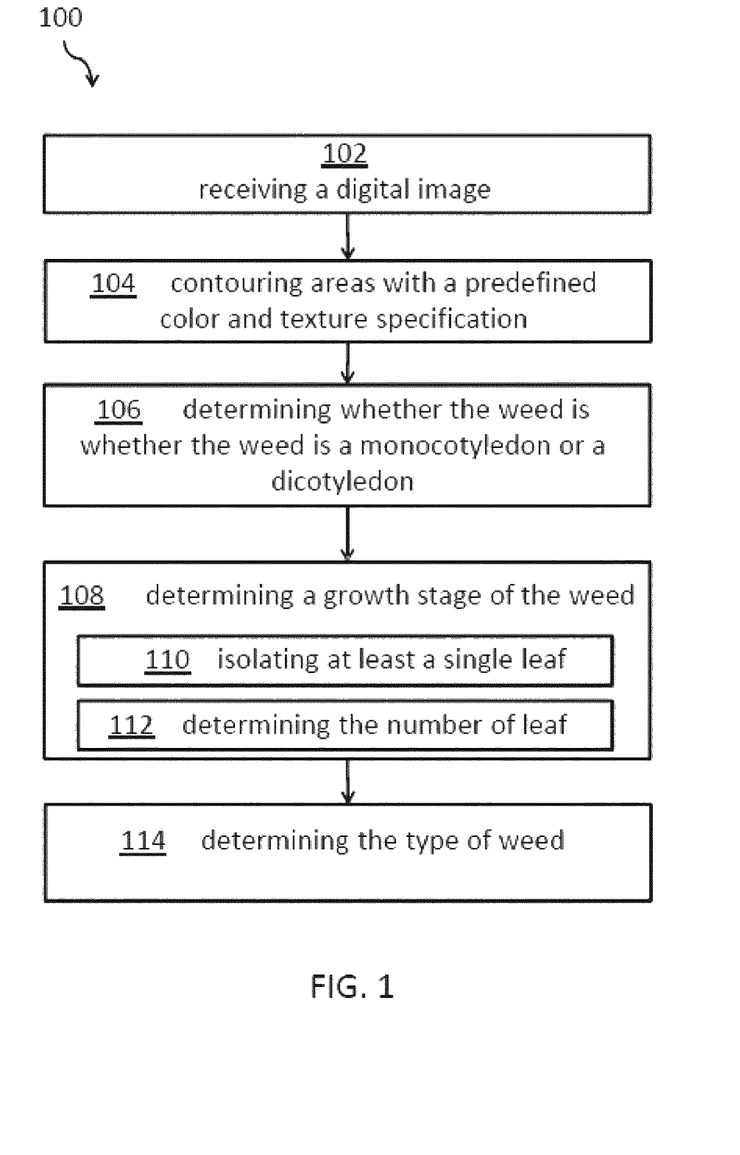
FIG. 1 shows a block diagram of an embodiment of the inventive method for recognizing of a type of weed in a natural environment.

FIG. 1 shows a block diagram of an embodiment of the method 100 for identifying a type of weed based on a digital image taken in a natural environment. The method comprises receiving, 102, a digital image. The digital image may be taken by an operator of a digital camera, e.g., a farmer in the field or a camera on an autonomous vehicle. The farmer may use the digital camera of a smartphone for taking the digital image and sending it to the identification system. The digital image received via, e.g., the smartphone by the identification system may comprise data representing a weed in an early growth stage in the natural environment among cultivated crop as well as metadata relating to the digital image. The metadata may comprise GPS data of the location of the digital image, i.e., the weed together with a height value above zero, etc. of the location of taking the digital image.

The method comprises further contouring, 104, areas with a predefined color and texture specification in an RGB color model within the digital image building at least one contoured area comprising pixels of the weed within a boundary contour, in particular a boundary line. There may be at least one weed plant or eventually more. With other words, green plant areas are detected that are different to a background, e.g., the soil of the field. Furthermore, the method may comprise determining, 106, whether the weed is a monocotyledon or a dicotyledon. These two kinds of weeds may be identified relatively easy because the number of embryonic leaves or cotyledons may be determined using a trained classifier. Alternatively, an input may be made by the operator of the camera whether weed of the digital image is a monocotyledon or a dicotyledon. Even untrained farmers or operators may differentiate these two types of plants.

Additionally, the method may comprise determining, 108, a growth stage of the weed by isolating, 110, at least a single leaf of the weed by determining a joint center of the contoured area and determining, 112, the number of leaves within the contoured area. This may be performed using an image processing function taken from an advanced digital image processing library, like, e.g., the Halcon library from a company named MVTec. The term 'isolating' may denote a process of differentiating pixels relating to the weed from pixels of the background of the digital image. Thus, it may be a logical isolation such that the weed may be treated as one logical object of the data structure of the digital image.

The actual segmentation into single leaves may be performed in the following way: The digital image is converted from the RGB color space into the HSV (Hue Saturation Value) color space and segmented using thresholding, resulting in a binary segmentation. In order to get individual leaves, firstly a distance transformation is applied inside the foreground region of the binary segmentation. After that, the local maxima of the distance map are used as seeds for a subsequent watershed segmentation, which separates individual leaves from each other.

A further step of the method is the determining, 114, the type of weed identified by a weed name and a probability of the correctness of the determination using at least one out of a plurality of the received metadata and derived from at least one out of a plurality of characterizing and/or derived metadata determined during the contouring, during the determining whether the weed is a monocotyledon or a dicotyledon, and during the determination of the growth stage of the weeds. These metadata are used as input parameters to a set of classifiers. The at least one classifier of the set may have access to a storage system, i.e., a database comprising names of types of weeds—e.g., several hundred—together with a plurality of sets of metadata per weed type.

The classifiers may a selection out of neural network classifiers, linear classifiers and/or sample based identifiers. Additionally, library or historic data may be used during the identification process, like historic weed identification data from earlier seasons at the same or a comparable time, special weather conditions like actual and/or historic weather conditions, etc.

Last but not least the method may comprise sending (not shown) results of the determination—e.g., the three most probable results with the related probability of the determination—to, e.g., back to the smartphone the digital image was received from.

Figure 2:
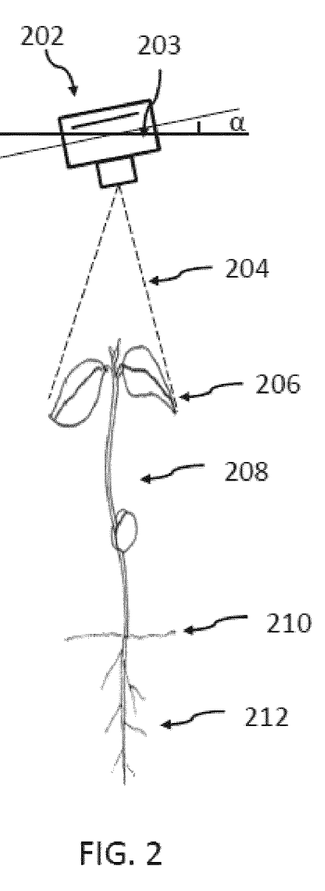
FIG. 2 shows a block diagram of an embodiment of a capturing of a digital image of a dicotyledon.

FIG. 2 shows a plant, in particular weed and an image capturing device 202. This may be a camera of a smartphone (not shown). The camera 202 may have an objective and a certain opening angle 204. The captured digital image may capture the leaf(s) 204 of the weed, here a dicotyledon. The stem 208 may, e.g., be covered by the one or more leaves 206. In the cross-section also the earth surface 210 and the root 212 of the weed is shown. In an optimal case, the camera's image plane 202 may be completely parallel to a longitudinal extension of the leaves 206, i.e., along the earth surface. However, smaller deviations indicated by the angle α may be acceptable.

It may also be noted that the digital image may not only have captured more than one leaf of a weed, but also more than one plant of potential weed. However, ideally, each captured image would only have one weed plant or leaf for an easier recognition process. The captured digital image of the weed may be transmitted, e.g., by wireless technology from the camera 202 to a data center comprising the identification system for an identification of weed in a natural environment. In one embodiment, the camera 202 may be a component of a smartphone. In another embodiment, the camera itself may be equipped with wireless sending and/or receiving technology. The camera may also be mounted on a drone or a moving earthbased robot in the field.

Figure 3:
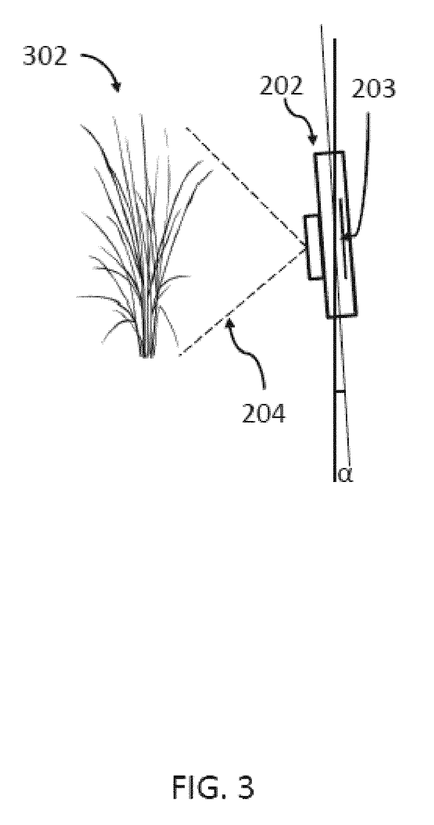
FIG. 3 shows a block diagram of an embodiment of a capturing a digital image of a monocotyledon.

FIG. 3 shows a comparable scenario for monocotyledon 302, e.g. grass. Capturing a digital image from above a monocotyledon 302 may not reveal enough information for a classification and determination of the type of weed. Therefore, monocotyledon 302 may be digitally photographed from the side of the plant, or the weed may be extracted from the soil and put flat on the soil. In that case, a capturing of the weed may be performed as discussed in the case of FIG. 2. Otherwise, if the monocotyledon roots are still in the soil, the optical capturing plane 203 of the digital camera 202 should be vertical to the earth surface. Also here, smaller deviations indicated by the angle α may be acceptable.

Figure 4:
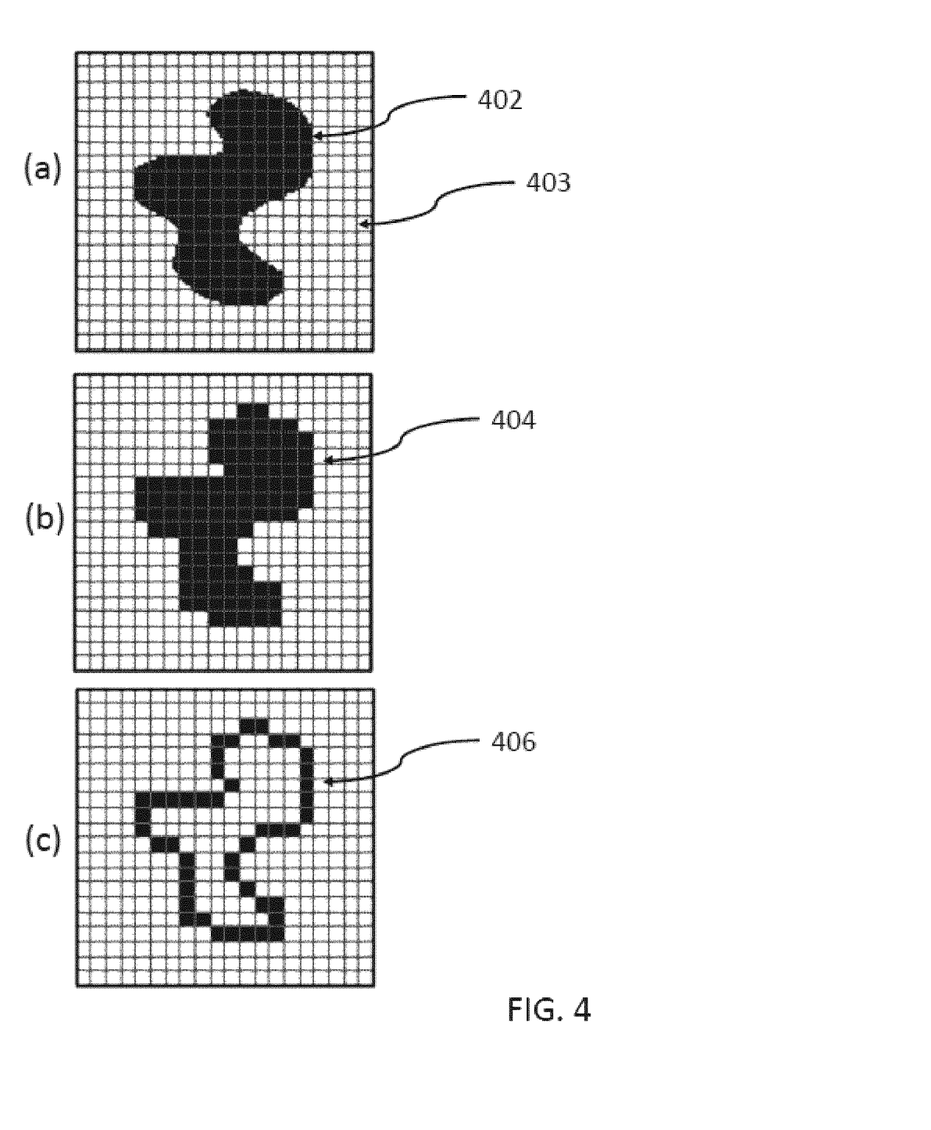
FIG. 4 shows an embodiment of steps of the area contouring process.

FIG. 4a, 4b, 4c show the process of contouring. FIG. 4a shows a projection of a weed leaf 402 on an image sensor 203 and/or a respective matrix of pixels. Each small square 403 may represent one pixel. A skilled person will acknowledge that, for the purpose of explanation, a very coarse-grained matrix is used here. Typically, the camera may have a resolution of several million pixels. FIG. 4b shows the result of a digitization. Now, the smooth edges of the leaf 402 are gone and the original analog shape is digitized (404). In a next step—FIG. 4c—the contour of the potential leaf may be extracted or isolated from the digital image. Everything inside the contour 406 may be counted as a leaf or weed pixel.

Figure 5A:
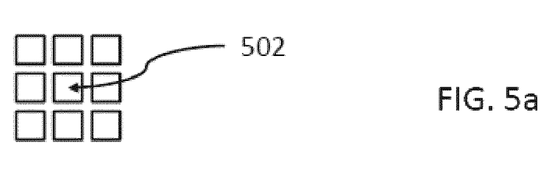
FIGS. 5a, b illustrate a concept of including further rings of pixels in the contouring process.

FIG. 5a shows details of the determination process whether a certain pixel may belong to a weed leaf or not. In the simplest case, the color value of a simple pixel $p_i$ 502 is used as determination criterion. The related color range may comprise, e.g., wavelengths of 495 to 575 nm. However, sometimes such a simple differentiation may not be sufficient. Therefore, pixels surrounding the pixel 502 in question are also taken into account. FIG. 5 shows a first "ring" of additional pixels directly surrounding pixel 502. Equation (1) may be used to also use the information related to pixel $p_i$ 502.

Figure 5B:
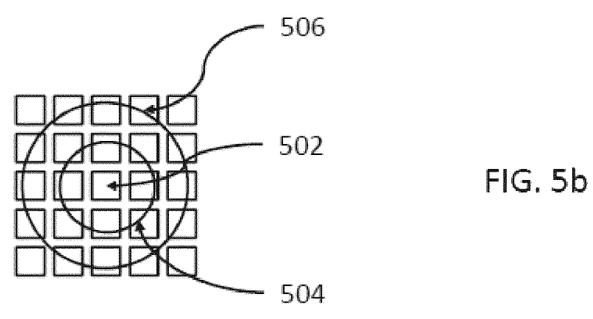

FIG. 5b shows in addition to the first "ring" 504 of pixels surrounding pixel 502 a second "ring" 506 of surrounding pixels. The influence or weighing of the decision whether pixel 502 is determined to be a leaf pixel or not, may decrease the further away a certain pixel may be from the pixel 502 in question. Further rings of pixels $p_{i,j}$ may be used and may become variables of the function F. The number of rings used may be a function of the total resolution of the received image.

Figure 6:
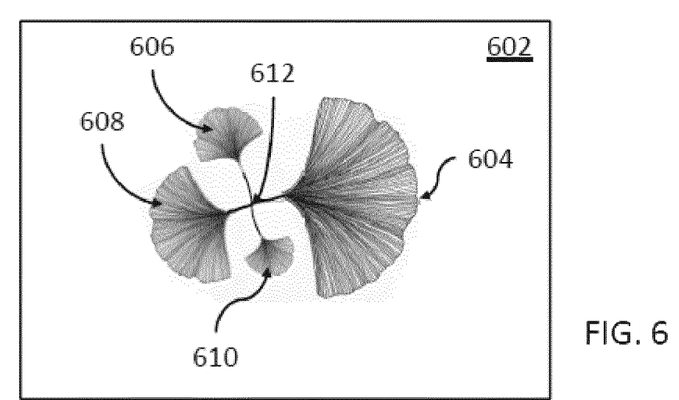
FIG. 6 shows an embodiment of an image of weed with four leaves and a joint center.

FIG. 6 shows a digital image 602 of an example of weed comprising four leaves 604, 606, 608 and 610. Based on this, using a classifier or another suitable image recognition library component, the method allows a determination of a growth stage of the weed by isolating or recognizing at least one single leaf of the weed. For this, a joint center 612 may be determined as part of the contoured area comprising the, e.g., four leaves 604, 606, 608, and 610. Using the same classifier or the same or another suitable image recognition library component also the number of leaves within the contoured area may be determined. This allows for a determination of the growth stage of the weed according to the BBCH code. The result may be stored as a derived metadata.

Figure 7:
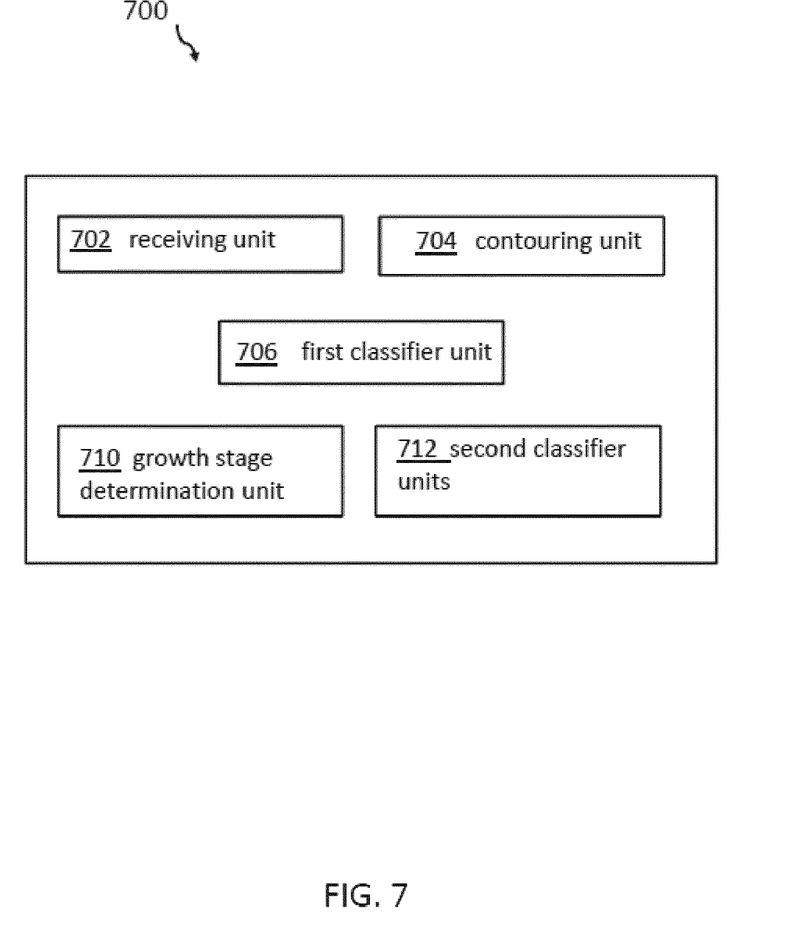
FIG. 7 shows a block diagram of an embodiment of the weed identification system.

FIG. 7 shows a block diagram of an embodiment of the identification system 700 for an identification of a type of weed based on a digital image in a natural environment. The identification system comprises a receiving unit 702 adapted for receiving a digital image comprising data representing a weed in an early growth stage in the natural environment among cultivated crop. Additionally, the metadata are received relating to the digital image. The identification system 700 also comprises a contouring unit 704 adapted for contouring areas with a predefined color and texture specification in an RGB color model within the digital image building at least one contoured area comprising pixels of the weed within a boundary. A first classifier unit 706 is adapted for determining whether the weed is a monocotyledon or a dicotyledon. A growth stage determination unit 708 is adapted for determining a growth stage of the weed by isolating, i.e. recognizing at least a single leaf of the weed by determining a joint center of the contoured area and determining the number of leaves within the contoured area.

A set of second classifier units 712 is adapted for determining the type of weed identified by a weed name and a probability of the correctness of the determination using at least one out of a plurality of the received metadata, and a plurality of metadata determined by the contouring unit, by the determining the first classifier unit, and the determination unit as input parameters, the set of the second classifier units having access to a storage comprising names of types of weeds together with a plurality of sets of metadata per weed type.

A summing unit may combine the determination of the individual classifiers in case the classifiers work in parallel. Alternatively, one or more classifiers could also work in series, such that an output of one classifier may be an input to a subsequent classifier. A network of artificial neurons with artificial synaptic elements may be used for that.

Figure 8:
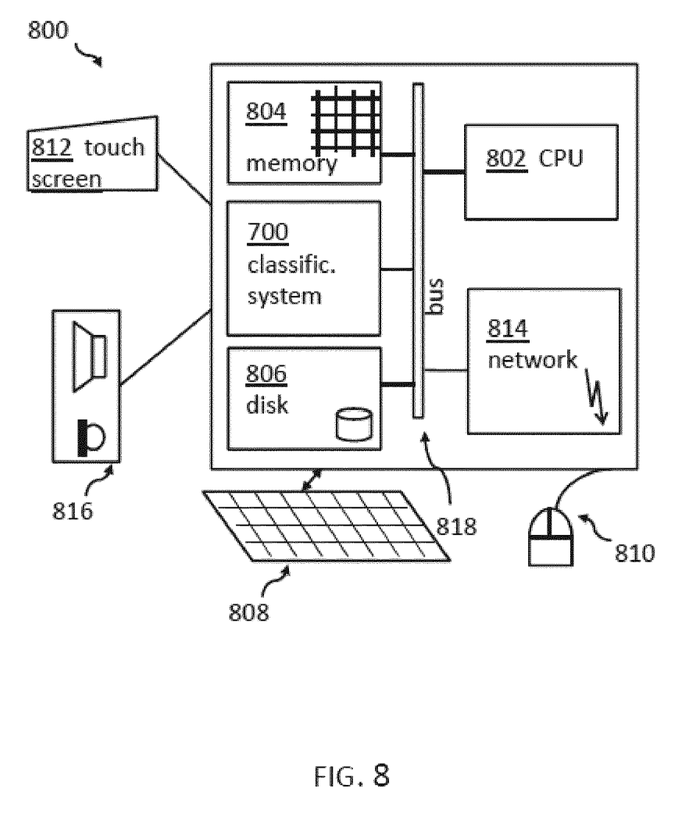
FIG. 8 shows an embodiment of a computing system comprising the identification system.

Embodiments of the invention may be implemented together with virtually any type of computer—in particular a smartphone—regardless of the platform being suitable for storing and/or executing program code. FIG. 8 shows, as an example, a computing system 800 suitable for executing program code related to the proposed method. Beside smartphones, also other mobile devices with a camera, a processor for executing program code and a transceiver may be suited for the implementation of the proposed method and/or related recognition system.

The computing system 800 is only one example of a suitable computer system and is not intended to suggest any limitation as to the scope of use or functionality of embodiments of the invention described herein. Regardless, computer system 800 is capable of being implemented and/or performing any of the functionality set forth hereinabove. In the computer system 800, there are components, which are operational with numerous other general purpose or special purpose computing system environments or configurations. Examples of well-known computing systems, environments, and/or configurations that may be suitable for use with computer system 800 include, but are not limited to, tablet computers, hand-held or laptop devices, multiprocessor systems, microprocessor-based systems, programmable consumer electronics, smartphones, and digital camera with spare computing capacity that include any of the above systems or devices, and the like. Computer system 800 may be described in the general context of computer system-executable instructions, such as program modules, being executed by a computer system 800. Generally, program modules may include routines, programs, objects, components, logic, data structures, and so on that perform particular tasks or implement particular abstract data types.

As shown in the figure, computer system 800 is shown in the form of a general purpose computing device. The components of computer system 800 may include, but are not limited to, one or more processors or processing units 802, a system memory 804, and a bus 818 that couples various system components including system memory 804 to the processor 802. Computer system 800 typically includes a variety of computer system readable media. Such media may be any available media that is accessible by computer system 800, and it includes both, volatile and non-volatile media, removable and non-removable media.

The system memory 804 may include computer system readable media in the form of volatile memory, such as random access memory (RAM) and/or cache memory. Computer system 800 may further include other removable/non-removable, volatile/non-volatile computer system storage media. By way of example only, storage system 812 may be provided for reading from and writing to a non-removable storage chip. Storage media can be connected to bus 806 by one or more data media interfaces. As will be further depicted and described below, memory 804 may include at least one program product having a set (e.g., at least one) of program modules that are configured to carry out the functions of embodiments of the invention.

A program/utility, having a set (at least one) of program modules, may be stored in memory 804 by way of example, and not limitation, as well as an operating system, one or more application programs, other program modules, and program data. Program modules may generally carry out the functions and/or methodologies of embodiments of the invention as described herein.

The computer system 800 may also communicate with one or more external devices such as a keyboard, a pointing device, a display 820, etc.; these devices may be combined in a touch-screen that enable a user to interact with computer system 800; and/or any devices (e.g., network card, modem, etc.) that enable computer system 800 to communicate with one or more other computing devices. Such communication can occur via input/output (I/O) interfaces. Still yet, computer system 800 may communicate with one or more networks such as a local area network (LAN), a general wide area network (WAN), and/or a mobile public network (e.g., the Internet) via network adapter 822. As depicted, network adapter 814 may communicate with the other components of computer system 800 via bus 818. It should be understood that although not shown, other hardware and/or software components could be used in conjunction with computer system 800. Examples, include, but are not limited to: microcode, device drivers, redundant processing units, etc.

Additionally, the identification system 700 for an identification of a type of weed in a natural environment may be attached to the bus system 818.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium, like e.g., solid state memory, a random access memory (RAM), a read-only memory (ROM).

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device such as an EPROM, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to the respective computing devices, e.g. as a smartphone app from a service provider via a mobile network connection.

Computer readable program instructions for carrying out operations of the present invention may be any machine dependent or machine independent instructions, microcode, firmware instructions, state-setting data, or either source code or object code written in any combination of one or more programming languages, including an object-oriented programming language such as C++, Java or the like, and conventional procedural programming languages, such as the "C" programming language or similar programming languages. The computer readable program instructions may execute entirely on the computer device. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The invention claimed is:

1. A method for identifying a type of weed based on a digital image of the weed in a natural environment, the method comprising:
    receiving a digital image comprising data representing a weed in an early growth stage in the natural environment among cultivated crop, and metadata relating to the digital image, wherein the early growth stage is defined by a BBCH code from 10 to 39,
    contouring areas with a predefined color and texture specification in an RGB color model within the digital image building at least one contoured area comprising pixels of the weed within a boundary contour,
    determining whether the weed is a monocotyledon or a dicotyledon
    determining the type of weed identified by one or more weed names and corresponding probabilities of a correctness of the determination using
        at least one out of a plurality of the received metadata, and
        at least one out of a plurality of derived metadata determined
            during the contouring, and
            during the determining whether the weed is a monocotyledon or a dicotyledon, as input parameters to a set of classifiers having access to a storage system comprising names of types of weeds together with a plurality of sets of metadata per weed type, wherein the one or more weed names are compared with a weed probability map which maps probability occurrences of weeds for geographic locations and seasonal data to exclude wrongly identified names of weeds from the determination.

2. The method according to claim 1, further comprises:
    determining a growth stage of the weed by
        isolating at least a single leaf of the weed by determining a joint center of the contoured area, and
        determining a number of leaves within the contoured area, and
    determining the type of weed identified by the one or more weed names and corresponding probabilities of the correctness of the determination using
        derived metadata determined during the determination of the growth stage of the weeds.

3. The method according to claim 1, wherein the predefined color specification relates to a color range of plants in a natural environment, in particular to a green color range of wavelength 490 to 575 nm.

4. The method according to claim 1, wherein the contouring areas with the predefined color and texture specification is performed by—determining for every pixel of the digital image whether a combination of its RGB color components matches one of a plurality of predefined color combinations.

5. The method according to claim 1, wherein the contouring of areas with the predefined color specification is performed additionally by a determination of $$wi = F(pi, pij)$$

wherein
    wi=1 or 0 indicating RGB that pixel i belongs to weed or not,

F is a function calculating a probability for weed/non-weed based on color attributes of pi and all of pj,
pi=pixel i, pi,j=combined pixels j surrounding the pixel i.

6. The method according to claim 1, wherein the determining whether the weed is a monocotyledon or a dicotyledon comprises
applying a classifier which has been trained to distinguish between monocotyledon and dicotyledon weeds resulting in a binary monocot-dicot identifier value.

7. The method according to claim 1, wherein derived metadata comprise at least one selected out of a group comprising binary monocot-dicot identifier value, a number of leaves determined, and a development growth stage.

8. The method according to claim 1, wherein the received metadata comprises at least one out of a group comprising global positioning system data values of a capturing location of the digital image, a calendar date, topography data related to the global positioning data system data values, acceleration data of a capturing device during a moment of capturing the digital image, a tilt angle of the capturing device during capturing the digital image, and a camera type the digital image was captured with.

9. The method according to claim 1, wherein each metadata value has a predefined weighing value which is also used as input parameter to the set of classifiers.

10. The method according to claim 1, wherein the determination of the type of weed identified by the one or more weed names also comprises
recalculating the probabilities of the correctness of the determination based on the comparing the name of the determined one or more weed names with the weed probability map.

11. The method according to claim 1, also comprising
sending the weed names and a related probability of the correctness of the determination for the weed names having the three highest probability values to a device by which the digital image was taken.

12. An identification system for identifying a type of a weed based on a digital image of the weed, the digital image comprising data representing the weed in an early growth stage in a natural environment among cultivated crop,
the identification system comprising
a receiving unit adapted for receiving the digital image, and metadata relating to the digital image,
a contouring unit adapted for contouring areas with a predefined color and texture specification in an RGB color model within the digital image building at least one contoured area comprising pixels of the weed within a boundary,
a first classifier unit adapted for determining whether the weed is a monocotyledon or a dicotyledon,
a set of second classifier units adapted for determining the type of weed identified by one or more weed names and corresponding probabilities of a correctness of the determination using
at least one out of a plurality of the received metadata, and
at least one out of a plurality of derived metadata determined
by the contouring unit, and
by the first classifier unit,
as input parameters, the set of the second classifier units having access to a storage comprising names of types of weeds together with a plurality of sets of metadata per weed type, wherein the one or more weed names are compared with a weed probability map which maps probability occurrences of weeds for geographic locations and seasonal data to exclude wrongly identified names of weeds from the determination.

13. The identification system according to claim 12, further comprises:
a determination unit adapted for determining a growth stage of the weed by
isolating at least a single leaf of the weed by determining a joint center of the contoured area, and
determining a number of leaves within the contoured area, and
wherein the set of second classifier units is adapted for determining the type of weed identified by the one or more weed names and the corresponding probabilities of the correctness of the determination using derived metadata determined by the determination unit.

14. The identification system according to claim 12, wherein the predefined color specification relates to a color range of plants in a natural environment, featuring the complete visible range with a focus in a green color range of wavelength 490 to 575 nm.

15. The identification system according to claim 12, also comprising
a sending unit adapted for sending the weed names and a related probability of the correctness of the determination for the weed names having the three highest probability values.

16. A non-transitory computer-readable medium having program instructions encoded thereon that, when executed by one or more computing devices, cause the computing devices to:
receive a digital image, and metadata relating to the digital image,
contour areas with a predefined color and texture specification in an RGB color model within the digital image building at least one contoured area comprising pixels of a weed within a boundary contour,
determine whether the weed is a monocotyledon or a dicotyledon,
determine a type of weed identified by one or more weed names and corresponding probabilities of a correctness of the determination using
at least one out of a plurality of the received metadata, and
at least one out of a plurality of derived metadata determined during the contouring, and
during the determining whether the weed is a monocotyledon or a dicotyledon,
as input parameters to a set of classifiers having access to a storage comprising names of types of weeds together with a plurality of sets of metadata per weed type, wherein the one or more weed names are compared with a weed probability map which maps probability occurrences of weeds for geographic locations and seasonal data to exclude wrongly identified names of weeds from the determination.

17. The non-transitory computer-readable medium according to claim 16, wherein said program instructions are executable by one or more computing devices to cause said one or more computing devices to
determine a growth stage of the weed by
isolating at least a single leaf of the weed by determining a joint center of the contoured area, and
determining a number of leaves within the contoured area, and determine the type of weed identified by the one or more weed names and the corresponding probabilities of the correctness of the determination using derived metadata determined during the determination of the growth stage of the weeds.

\* \* \* \* \*